(12) United States Patent
Baumann

(10) Patent No.: US 8,857,416 B2
(45) Date of Patent: Oct. 14, 2014

(54) CONNECTION BOX WITH A CHARGE AIR COOLING ARRANGEMENT OF AN INTERNAL COMBUSTION ENGINE

(75) Inventor: Hermann Baumann, Tettnang (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 342 days.

(21) Appl. No.: 13/459,141

(22) Filed: Apr. 28, 2012

(65) Prior Publication Data

US 2012/0325182 A1 Dec. 27, 2012

(30) Foreign Application Priority Data

May 10, 2011 (DE) .......... 10 2011 075 617

(51) Int. Cl.
 F02M 15/00 (2006.01)
 F02M 35/116 (2006.01)
 F02B 29/04 (2006.01)

(52) U.S. Cl.
 CPC .......... *F02B 29/0412* (2013.01); *F02M 35/116* (2013.01); *F02B 29/0462* (2013.01); *F02B 29/0431* (2013.01); *F02B 29/0475* (2013.01); Y02T 10/146 (2013.01)
 USPC .......................................... 123/542; 123/563

(58) Field of Classification Search
 CPC ............. F02B 29/0462; F02B 29/0412; F02B 29/0418; F02B 29/0437; F02B 29/0443; F02B 29/0475; F02M 25/0731; F02M 25/0734
 USPC .............. 123/542, 562–563, 568.11, 568.12, 123/568.15; 60/589–599, 605.2; 165/157–159, 162, 165, 169, 173, 165/175–176

See application file for complete search history.

(56) References Cited

U.S. PATENT DOCUMENTS

| | | | | | |
|---|---|---|---|---|---|
| 4,273,082 | A | * | 6/1981 | Tholen ........................ | 123/41.31 |
| 4,562,697 | A | * | 1/1986 | Lawson ........................... | 60/599 |
| 8,286,615 | B2 | * | 10/2012 | Dehnen et al. ................. | 123/542 |
| 2003/0150408 | A1 | | 8/2003 | Roithinger | |
| 2005/0109485 | A1 | * | 5/2005 | Kolb et al. ....................... | 165/42 |
| 2007/0267000 | A1 | * | 11/2007 | Raduenz et al. .......... | 123/568.12 |
| 2010/0095939 | A1 | * | 4/2010 | Geskes ......................... | 123/556 |

FOREIGN PATENT DOCUMENTS

| | | |
|---|---|---|
| DE | 103 09 808 | 5/2008 |
| DE | 10 2004 033 704 | 4/2010 |
| DE | 10 2004 033 704 | 11/2010 |

\* cited by examiner

*Primary Examiner* — Hung Q Nguyen
(74) *Attorney, Agent, or Firm* — Klaus J. Bach

(57) ABSTRACT

In a charge air supply arrangement of an internal combustion engine with two stage charging in a combination with first and second charge air coolers, a double connection box is provided with a guide structure including a separation wall defining a lower guide area with a lower connection to the first charge air cooler disposed directly below the double connection box and an upper guide area with an upper connection to the second charge air cooler disposed directly on top of the double connection box. Also, in an internal combustion engine with such a charge air cooling arrangement, the charge air cooler arrangement is arranged on top of the engine.

20 Claims, 5 Drawing Sheets

CONNECTION BOX WITH A CHARGE AIR COOLING ARRANGEMENT OF AN INTERNAL COMBUSTION ENGINE

BACKGROUND OF THE INVENTION

The invention resides in a connection box for an internal combustion engine with a charge air cooling arrangement and with a two-stage combustion air charging system and also to an internal combustion engine including such a connection box and charge air treatment.

In particular in connection with Diesel internal combustion engines combustion air charging is well established for increasing engine power output, efficiency and also for reduced exhaust gas emissions as a result of improved combustion of the Diesel fuel. This is actually necessary for complying with official exhaust gas emission limits. Depending on requirements in particular in connection with large Diesel engines, a two-stage charging system, that is a low-pressure stage and a high pressure stage charging system preferably but not necessarily in combination with exhaust gas recirculation has been found effective to consider the above aspects with a view to further improvements. However, because of the high pressure charge air, low pressure charge air and, if applicable, exhaust gas recirculation arrangements including the necessary charging fluid flow passages the design of a two-stage charging arrangement, in particular with exhaust gas recirculation, generally requires a relatively large installation space. For each charging stage, in addition to a turbocharger which includes an exhaust gas driven turbine and a charge air compressor, also a suitable cooling arrangement is needed for cooling the compressed charge air flows and/or exhaust gas recirculation flows before their admission to a combustion chamber of the internal combustion engine.

With a two-stage charging arrangement, at least a first and a second charge air cooler need to be included in a cooling arrangement. It may also be expedient to provide at least one exhaust gas recirculation cooler. In the various coolers pressure losses of the charging fluids should be kept as small as possible. This applies also to the exhaust gas conducted through an exhaust gas recirculation cooler. In the present case, in particular flow losses of a charge air flow to and from a charge air cooler should be kept low and, additionally, a heat exchange in a charge air cooler should be improved. To this end, a charge air cooler of a cooling arrangement of the type described above is connected to a charge air ducting structure via an air connection box. In this way a flow cross-section of the charge air guide structure can be adapted to a flow cross-section of the charge air cooler. A connection box may also provide a diffuser effect which serves to reduce substantially the flow speed and pressure losses by widening the flow cross-section.

The installation of the above components on an internal combustion engine does not only need to comply with requirements in respect to the available installation space but, in addition, flow-based requirements must be satisfied for optimizing engine power and exhaust gas discharge of an internal combustion engine. Such requirements are increasingly important in connection with smaller sizes of large Diesel engines. This concerns in particular the arrangement of a first and a second charge air cooler together with the usually space consuming connection boxes of a cooling arrangement in charge air guide structure. The provision of an intake-side and an exhaust-side air connection box at a first and a second charge air cooler has been found to be problematic in connection with two-stage charging of an internal combustion engine if in addition to flow guide requirements also the installation space for the cooling arrangement is tight.

A comparably compact flow guide structure for the cooling arrangement would therefore be desirable. The charge air guide structure with connection box, cooler arrangement for the charge air of a two-stage charging system and its installation on an engine should therefore require as little installation space as possible but still provide for advantageous flow conditions for the charge air supply of an associated internal combustion engine.

SUMMARY OF THE INVENTION

In a charge air supply arrangement of an internal combustion engine with two stage charging in combination with a charge air cooler, a double connection box is provided with a guide structure including a separation wall defining a lower guide area with a lower connection to a first charge air cooler disposed directly below the double connection box and an upper guide area with an upper connection to a second charge air cooler disposed directly on top of the double connection box, and an internal combustion engine with a charge air cooling arrangement is arranged on top of the engine.

The invention seeks to provide for an installation space optimization with a flow guide structure for connection to the cooling arrangement for the charge air with as little pressure losses as possible. The inventor has found that a charge air cooler does not necessarily need its separate convection box in a separate housing. Rather, the inventor has found that a cooling arrangement may include a single housing for accommodating a double connection box. The first charge air cooler and the second charge air cooler may then be arranged in an advantageous way relative to the double connection box. Proposed is to provide in the interior of the double connection box separate charge air guide structures for the first and second charge air coolers, that is, a bottom guide structure with a lower connecting area and an upper guide structure with an upper connecting area.

The double connection box can advantageously be incorporated into a housing design for the cooling arrangement. A double connection box may advantageously serve also as support element for the cooling arrangement. As a result, such a cooling arrangement may be particularly compact.

In a particularly advantageous embodiment, the first charge air cooler is arranged below the double connection box and the second charge air cooler is arranged on top of the double connection box, and the double connection box is designed for guiding the charge air coolers. In accordance with the invention, the interior of the connection box is divided by a separation wall into a lower ducting area which is connected to the first charge air cooler and an upper ducting area which is connected to the second charge air cooler. The lower ducting structure includes a lower connection to the first charge air cooler and the upper ducting structure includes an upper connection to the second charge air cooler. The separation wall is preferably fluid tight so as to prevent mixing of the charge air of the lower guide structure area and of the upper guide structure area.

In this way, at least an additional housing or separate connection box can be eliminated. Accordingly, the installation space requirements with the cooling arrangement according to the invention are relatively low. In particular, the lower and the upper ducting structures of the double connection box replace an inlet or outlet-side connection box for the first charge air cooler and an additional inlet and outlet-side connection box for the second charge air cooler. It has surprisingly been found that the installation space requirements of a double connection box with a separation wall is actually not larger than those for a commonly used single connection box. Consequently, the space requirements of cooling arrangements of cooling arrangements according to the invention are substantially reduced as it is provided in a compact packet design with also a substantially reduced number of parts.

The charge air cooling arrangement with a double connection box is particularly advantageous in connection for example with V-type engines as it can be accommodated partially in the intermediate space between the two rows of cylinders. A V-type internal combustion engine including a charge air cooling arrangement with a double connection box is therefore comparatively very compact.

In a particularly preferred embodiment as shown in an exemplary way in FIG. 3A, the first charge air cooler is a high pressure charge air cooler and the second charge air cooler is a low pressure charge air cooler. In another exemplary embodiment as shown in FIG. 3B the first charge air cooler is a low pressure charge air cooler and the second charge air is a high pressure charge air cooler.

With a single double connection box, not only the use of two otherwise used separate connection boxes can be avoided. The single separate double connection box may additionally be utilized in a constructive advantageous manner for the arrangement of the coolers. For example, the housing of the double connection box may have suitable mounting and support structures for the first and the second charge air cooler. The mounting and support expenditures are therefore small and realized in an advantageous manner. Overall, the efficiency and cost advantages are substantially improved by the concept according to the invention.

Preferably, the lower and the upper ducting areas are so designed that charge air in the lower and the upper areas is conducted in a counter-current pattern. Preferably, the separation wall includes a section in the interior which extends at an angle which widens the lower guide area toward the lower connection of the first charge air cooler and/or which widens the upper guide area toward the upper connection of the second charge air cooler. In this way, a diffuser effect of the lower and the upper ducting sections in the connection box upon admission of charge air to the first and the second charge air cooler is obtained.

Preferably, a double connection box includes at least one passage leading to the lower ducting area and at least two passages leading from the lower to the upper ducting area. It is particularly advantageous if between the first passage and the lower connection and/or between the second passage and the upper connection the lower and/or upper ducting area includes a reduction of the cross-section since it has been found that with this measure, the flow guide structure, particularly in the wall area of the separating mentioned, can be advantageously formed.

It is particularly advantageous if the separation wall has a wall area which extends in the interior at an angle and which increases in the lower ducting area the guide flow cross-section toward the first passage and in the upper ducting area the flow cross-section toward the second passage. Advantageously, a cross-section reduction for the lower guide area is in the area of the wall area which extends in the interior at an angle and for the upper area outside the wall area mentioned, particularly in the area of the essentially horizontally extending wall area of the housing of the double connection box.

Preferably, the double connection box is designed either exclusively for the admission of charge air to the first and second charge air cooler or exclusively for the discharge of charge air from the first and second charge air cooler. This has the advantage that the double connection box is exposed at both sides that is at its upper and lower connection either to hot charge air (in the first case of a double sided admission) or cold charge air (in the last mentioned case of a double sided discharge). The temperature conditions in the lower and the upper guide area are therefore substantially similar. A heat exchange via the separation wall via the separation wall which would affect the system design is avoided in this way in a simple manner.

An admission area is to be understood to be an area where charging air is supplied exclusively to a charge air cooler. A discharge area is to be understood to be an area where the charge air is only discharged from a charge air cooler. Preferably, the lower and the upper guide areas are discharge areas. Herein, the temperature stresses of the double connection box with cold air are relatively small. It is advantageous if the lower connection and the upper connection are discharge connections for charge air from the first and second charge air coolers. A discharge connection is a connection through which charge air flows only unidirectionally from a charge air cooler into the interior of the connection box.

In a particularly preferred design of the double connection box, a lower connection is a provided at the bottom side and an upper connection is provided at the top side of the double connection box opposite the bottom side thereof. Preferably, at least one upper connection is a connecting flange for example in the form of a support flange. A support flange is reinforced and mounted to the double connection box in such a way that the second charge air cooler can be supported above the double connection box. Preferably, the second charge air cooler is directly attached to the support flange, for example, by means of bolt connections or similar mounting means. Preferably, the first charge air cooler is attached below the connection box directly to the lower connection flange also for example by bolt connections as similar.

In addition to the lower and the upper connections, advantageously a first and a second flow passage—preferably discharge passages—are provided on the double connection box. A flow passage is to be considered to be an opening in the double connection box leading to a charge air duct outside a charge air cooler. If the opening is in the form of a discharge opening, it is an outlet of the double connection box for discharging charge air. A lower and an upper connection in this case form each an inlet of the double connection box. A reversal of the assignment of outlet and inlet is possible as described above.

Basically, the passages may also be arranged at different side walls of a housing design. Preferably, a first and a second passage—preferably, a discharge opening, are arranged at the double connection box for charge air at a single side of the double connection box. In this way, communication with a charge air guide arrangement charge air can advantageously be established and the first and the second charge air cooler can be connected to the double connection box via short lines. This measure has also been found to be advantageous with regard to an overall design of the whole system since for example the first and the second passages are arranged at a first side wall of the double connection box and other connections may possibly be arranged, in particular for cooling means of the charge air cooler, on a second side wall of the housing for the cooler arrangement opposite the first side wall.

In an advantageous design, a second opening is arranged between two openings or passages of the mentioned first type. In particular in a further development, the double connection box may be provided with two first passages leading to the upper guide area. The second passage may be arranged between the two first passages and extend to the lower guide area.

The double connection box may also have two first passages which extend to the lower guide area. Between the two passages extending to the lower guide area, then the second passage is arranged which extends to the upper guide area.

These arrangements can be realized within a frame which is divided along its cross-section by the separation wall mentioned earlier. The frame may have charge air channels disposed on the side adjacent the separation wall which widen the passages. The charge air channels may be designed considering flow and construction engineering requirements. Preferably, the cross-sectional area of the frame is further divided by two webs abutting the separation wall.

Preferably, the separation wall is arched over the cross-section of an inlet opening, particularly in the above-mentioned frame. The arched area is preferably used to arrange a second opening between the two first openings in the manner as described earlier. An arched area as mentioned earlier is formed in a practically rectangular frame by a downward extension particularly toward the lower connection. This provides for a particularly efficient flow guide structure.

The double connection box may also be formed in or as a part of a housing design for the first and/or the second charge air cooler. It has been found to be advantageous if the housing of the double connection box and that of the first and the second charge air cooler are simply attached to each other, for example, by screw clamp, cement or other connecting means.

The multipart housing construction formed by utilization of the housing of the double connection box can be provided in a simple manner with coolant connections for the charge air cooler. Preferably, the coolant connections are all formed at a single side of the support housing. Expediently, they are arranged at a side opposite the side with the openings for the charge air. The cooling liquid lines can then be more easily installed at the side opposite the charge air openings.

Preferably, an additional, lower connection box is connected to the lower charge air cooler for conducting charge air to the lower charge air cooler. The lower connection box is provided particularly for supplying charge air, possibly from a HD-ATL (high-pressure turbocharger) (for example, FIG. 3A) or a ND-ATL (low-pressure exhaust gas turbocharger) (FIG. 3B) to the lower charge air cooler. Advantageously, an additional upper connection box is connected to the upper charge air cooler for conducting charge air to the upper charge air cooler. The upper connection box serves in particular for supplying charge air—possibly from a ND-ATL (low pressure exhaust gas turbocharger) (for example, FIG. 3A) or HD-ATL (high pressure exhaust gas turbocharger) (for example, FIG. 3B) to the upper charge air cooler.

In another embodiment, the double connection box provided with a separation wall is arranged directly between the housing of the first and the second charge air coolers and the upper and lower connection boxes are directly connected to the second and the first charge air coolers. This provides for a stable cooler arrangement with optimal flow conditions which furthermore can be easily manufactured with the housing design and double connection box combination.

The concept according to the invention concerns an internal combustion engine in particular in the form of a Diesel engine with a cooler arrangement as described or a further development for two-stage charging. The internal combustion engine is in particular also provided with exhaust gas recirculation. Such a two-stage charging arrangement, in particular additionally with exhaust gas recirculation, is mounted to a housing of the internal combustion engine. The cooling arrangement is disposed on the engine housing. It has been found to be particularly advantageous if the engine housing includes a V-arrangement of the cylinders and the cooling arrangement is arranged in or on the space between the V-arrangement.

It is advantageous if the engine housing forms a lower wall area of a lower connection box. Preferably, the lower connection box is directly connected to the lower charge air cooler for guiding charge air in the lower charge air cooler. The lower charge air cooler may be directly in communication with the lower charge air cooler (as shown in FIGS. 3A-4) for supplying charge air thereto. However, the lower connection box may also be connected to the lower charge air cooler for receiving compressed charge air therefrom (as shown in FIG. 2). The lower connection box can therefore be realized in a material-saving manner by utilizing the engine housing as wall area. Exemplary embodiments of the invention will be described below on the basis of the accompanying drawings. The drawings are not prepared to scale, but serve only as explanatory schematic samples. Modifications and changes concerning the form and details are of course possible without departing from the concept of the invention. The features disclosed in the drawings, the description and the claims may be essential for a further development of the invention either alone or in combination. Also, within the frame of the invention are all combinations of at least two of the features disclosed in the description the drawings and/or the claims. The concept of the invention is not limited to the exact form or detail of the embodiments described and shown or to a device which would be limited in comparison with the claimed device. For simplicity, identical or similar parts or parts with identical or similar functions are indicated in the following description by the same reference numerals.

DESCRIPTION OF PARTICULAR EMBODIMENTS

Figure 1:
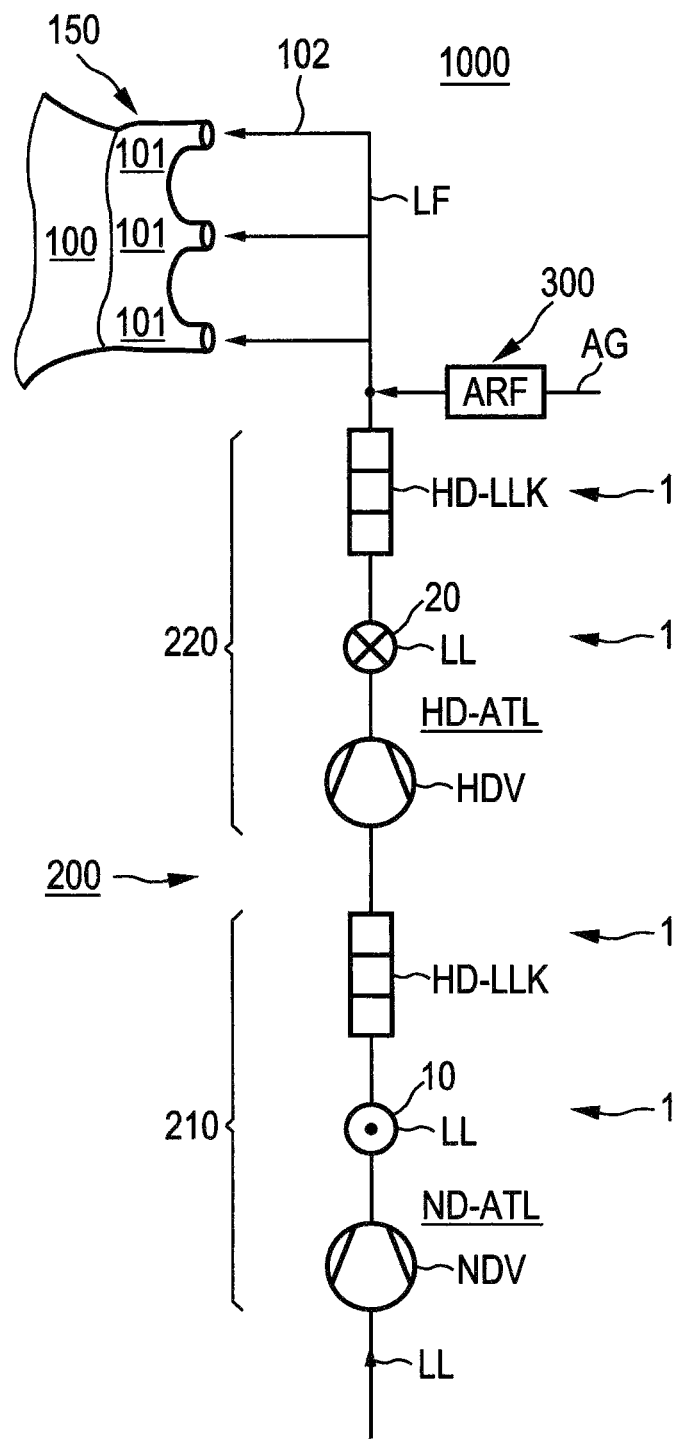
FIG. 1 shows a flow diagram of a two-stage charging arrangement at the charge air side of an internal combustion engine for connection with a cooling arrangement here in the form of a pure charge air cooling arrangement.

FIG. 1 shows schematically an internal combustion engine 1000 with an engine housing 100 and associated cylinder bank 150 with a number of charge fluid supply lines 102 each to a cylinder 101 of the cylinder bank 150. To the charging fluid supply lines 102 for charge fluid LF an air side supply line for charge air LL from a two-stage charge air compression arrangement 200 and exhaust gas AG from an exhaust gas recirculation arrangement 300 is connected. Under "charging fluid" a mixture of charge air LL and recirculated exhaust gas AG is to be understood.

Figure 2:
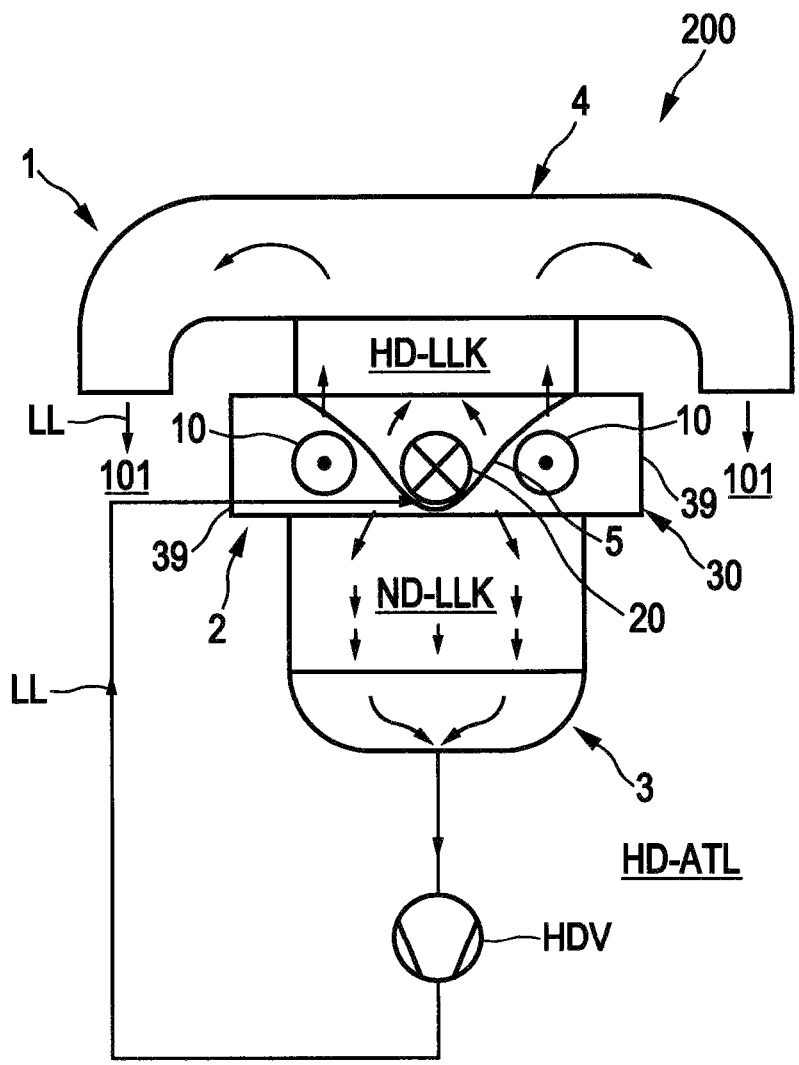
FIG. 2 represents a first embodiment of a cooling arrangement with a double connection box for combination with a two-stage charging arrangement as shown in FIG. 1.
Figure 3A:
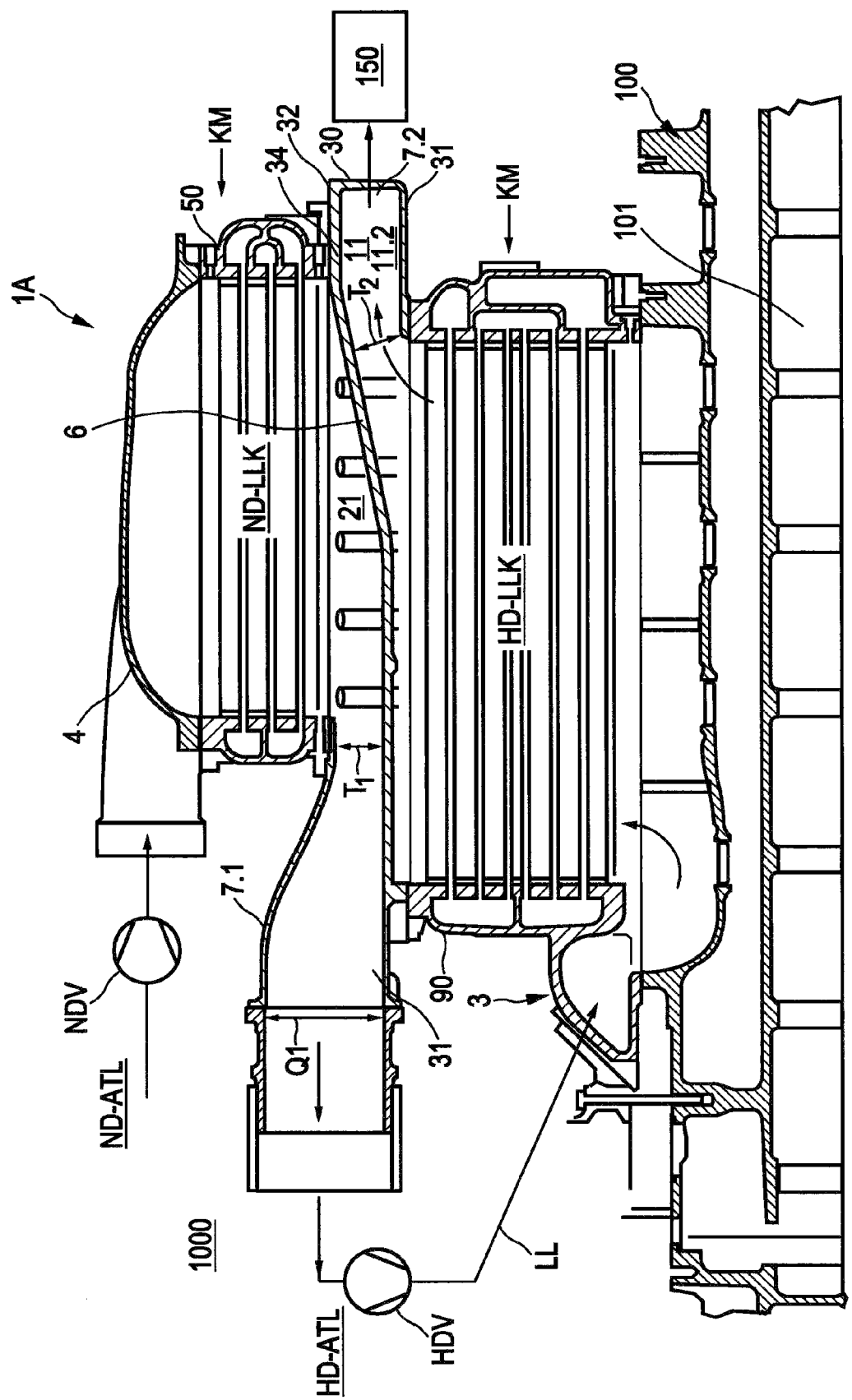
FIG. 3A is a right side sectional view of a second embodiment of a cooling arrangement in a first preferred design for a Diesel internal combustion engine.

The charge air compression arrangement 200 includes a low pressure stage 210 and a high pressure stage 220 arranged in flow direction downstream of the low pressure stage 210. Between the high pressure stage and the charging fluid supply line 102 the exhaust gas recirculation arrangement 300 is connected to the charging fluid supply line. In the present case, by way of the charge air compression arrangement 200 twice compressed and cooled charge air LL is suitably mixed with exhaust gas AG and the so mixed charging fluid LF is supplied to the combustion chambers of the cylinders 101 of the cylinder bank 15 via the schematically shown intake manifold of the charging fluid supply 102. In the two stage charge air compression arrangement 200, the flow direction of the charge air is indicated by arrows (FIGS. 2-4). The charge air LL is compressed by a low pressure compressor NDV of a low pressure exhaust gas turbocharger ND-ATL of the low pressure stage 210 and subsequently cooled in a low pressure charge air cooler ND-LLK. Then the charge air LL is further compressed in a high pressure compressor HDV of a high pressure exhaust gas turbocharger HD-ATL of the high pressure stage 220 and then cooled in a high pressure charge air cooler HD-LLK. The low pressure charge air cooler ND-LLK and the high pressure charge air cooler HD-LLk are part of a cooler arrangement 1, 1A, 1B of which preferred embodiments are shown in FIGS. 3A and 3B.

Referring now to FIG. 2, the air-side conduction of the charge air LL of FIG. 1 is shown in a cross-sectional view of the cooling arrangement 1 for the internal combustion engine 1000. The cooler arrangement 1 includes the low pressure charge air cooler ND-LLK, the high pressure charge air cooler HD-LLK and a double connection box 2 directly disposed between and directly connected to the high and low pressure charge air coolers. In this embodiment, the double connection box 2 has two first openings or passages 10 and a single second opening 20. Via the opening 10, charge air LL is supplied to the low pressure cooler ND-LLK from the low pressure compressor NDV. Via the opening 20 charge air LL is supplied from the high pressure compressor HDV to the high pressure charge air cooler HD-LLK. The openings 10, 20 shown are supply openings to the double connection box 2 as shown schematically in FIG. 2. The supply openings 10, 20 therefore direct the charge air LL as appropriate to the low pressure charge air cooler ND-LLK and the high pressure charge air cooler HD-LLK.

Figure 3B:
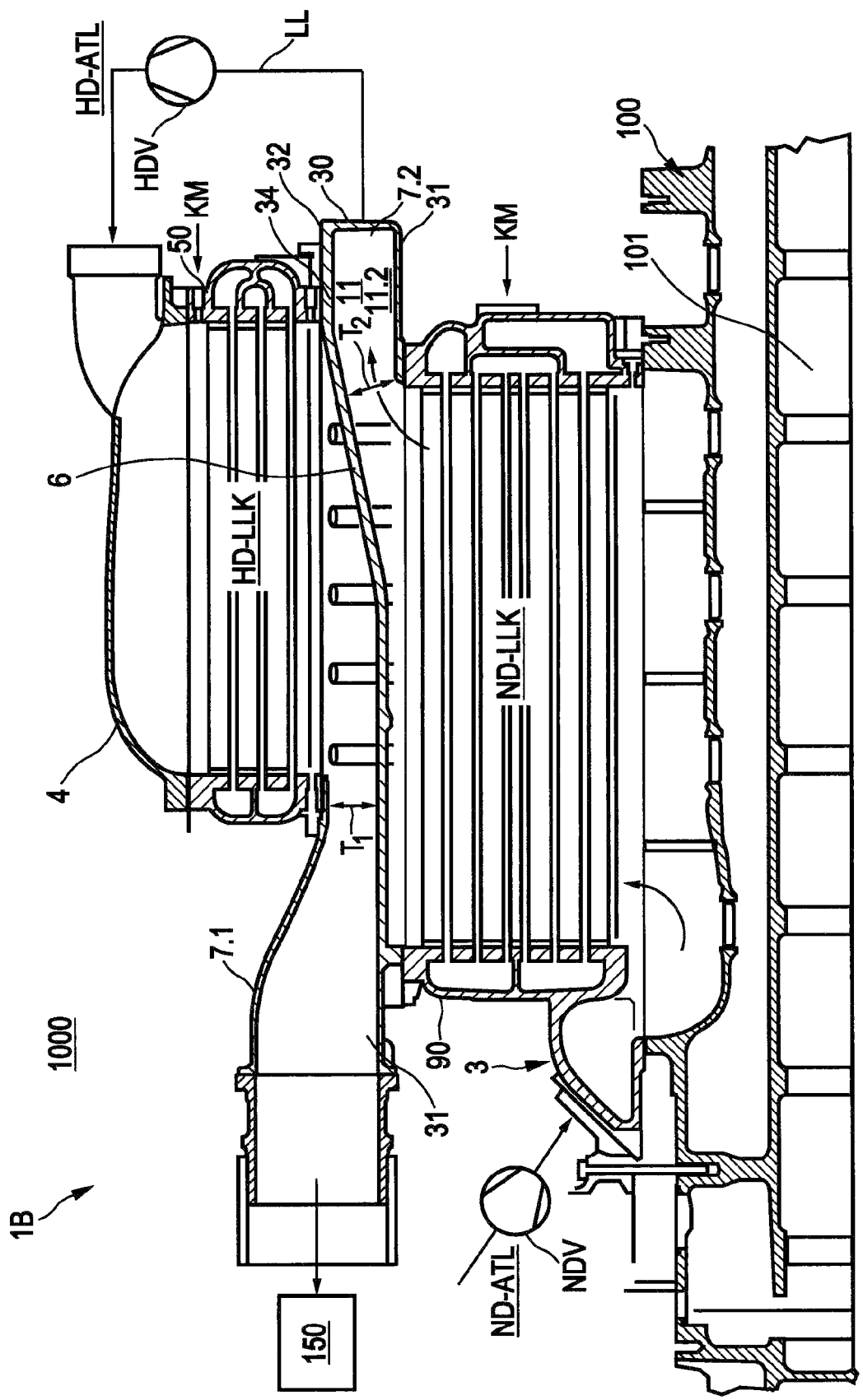
FIG. 3B is a right side sectional view of a second embodiment of a cooling arrangement with a second design realization for a Diesel internal combustion engine.
Figure 4:
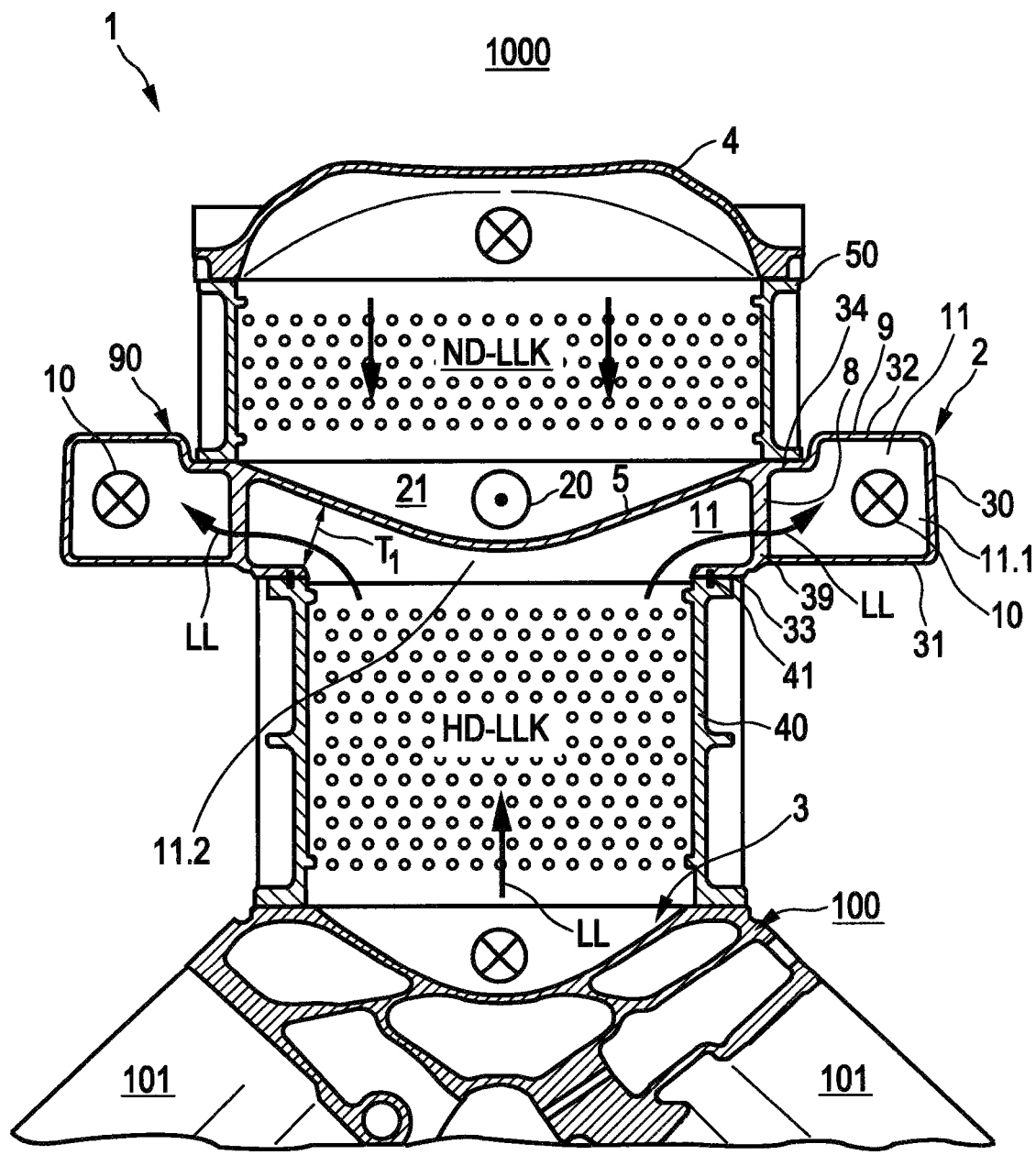
FIG. 4 is a sectional view as seen from the power output end of the engine of a cooler arrangement of the cooler arrangement as shown in FIG. 3A.

The low pressure charge air cooler ND-LLK is shown in the embodiment of FIG. 3B below the double connection box 2 and in direct communication therewith via a lower connection and the high pressure charge air cooler HD-LLK is supported directly on the double connection box 2 and in communication therewith via an upper connection which is not marked. The lower and upper connections are supply connections to the low pressure charge air cooler ND-LLK and, respectively, the high pressure charge air cooler HD-LLK in the embodiment shown schematically in FIG. 2.

The cooler arrangement 1 additionally comprises a lower connection box 3 which is arranged below and in communication with, the lower low pressure charge air cooler ND-LLK in the embodiment for discharging the charge air LL from the low pressure charge air cooler ND-LLK. The cooler arrangement 1 includes also an additional upper connection box 4, which is arranged directly above and in communication with the upper high pressure charge air cooler HD-LLK in the embodiment schematically shown in FIG. 2 for discharging the charge air of the upper charge air cooler HD-LLK.

The charge air is conducted along a path as indicated in FIGS. 1 and 2 by the arrows. It is admitted to the double connection box 2 via the openings 10, 20 and from the double connection box 2 directly to the chair coolers LLK. The charge air LL is first, via the mentioned two openings 10, supplied from the low pressure compressor NDV to the double connection box 2 and then directly to the low pressure charge air cooler ND-LLK, which is arranged below the double connection box 2. Then the charge air LL is conducted via the additional connection box 3 to the high pressure compressor HDV. The compressed charge air LL is then via the second opening 20 returned to the double connection box 2 and then directly supplied to the high pressure charge air cooler HD-LLK. From the high pressure charge air cooler HD-LLK, the charge air LL is conducted via the upper connection box 4 toward the engine housing 100 and after admixture of exhaust gas AG from the exhaust gas recirculation arrangement AGR 300 supplied to the cylinders 101 of the engine housing 100.

In the cross-sectional view of the cooler arrangement as shown in FIG. 2, the double connection box 2 includes a single second opening 20 and two first openings 10. These are provided in an essentially rectangular frame 39 formed by the housing 30 of the double connection box 2, which frame provides about the total cross-section of the inlet openings 10, 20. In the frame 39, the separation wall 5 of the double connection box 2 is indicated. The separation wall 5 is in this embodiment arched downwardly that is it circumscribes with the inside of the single second opening 20 whereas the two first openings 10 are disposed at the opposite outer side of the arched separation wall 5.

A first embodiment is shown in FIG. 3A in combination with FIG. 4, which is an axial view from the power output end KS of the internal combustion engine 1000. The first generally preferred embodiment of the cooler arrangement 1a with double connection box 2 and additional lower and upper connection boxes 3, 4 and with the charge air cooler ND-LLK, HD-LLK is shown together with a cylinder bank 150 indicated schematically in FIG. 3A. A second embodiment is shown in FIG. 3B together with a cooler arrangement 1B. For identical or similar features or features with identical or similar functions, the same reference numerals are used as in FIGS. 1 and 2. The cooler arrangement 1A of FIG. 3A, FIG. 4 and the cooler arranged 1B of FIG. 3B may also be integrated into a double stage charging arrangement 200 with adaptation of the flow directions—different from FIG. 2. In addition, a charge air flow pattern is provided in accordance with the arrows of FIG. 3A, FIG. 4 and, respectively, 3B—analogous to the pattern of FIG. 1.

Below, the design of the double connection box is described in greater detail. An interior space of the housing 30 of the double connection box 2 is divided by a separation wall 5—similar to FIG. 2. The separation wall 5 extends—as seen in the longitudinal sectional view of FIG. 3A—along a longitudinal axis and in a wall area 6 inclined to the walls of the housing 30. In the embodiment as shown in FIG. 3A and in the longitudinal sectional view, the separation wall 5 extends starting from the left at an edge 31 of the housing 30 of the double connection box 2, first about parallel to the walls of the housing 30 then, further in the wall area 6, inclined toward an upper edge 32 of the housing 30 of the double connection box 2.

In the cross-sectional view as shown in FIG. 4 from the power output end KS of an internal combustion engine 1000 in a sectional view transverse to the longitudinal axis—the separation wall 5 is arched downwardly at least in the wall area 6. In accordance with FIG. 4 in this way, the interior space is, at least in the area 6 of the double connection box 2, divided into three opening areas, that is into two openings 10 as well as a single opening 20. The openings in the present case are charge air exit openings for conducting charge air from the double connection box 2 to a high-pressure compressor HDV on one hand and to a cylinder bank 150 on the other. Generally, the openings 10, 20 can be combined in a common exit stub 7.1, that is, the exit area around the openings 10, 20 may be divided already in the interior into the three separate exit openings. This is particularly the case in an embodiment where charge air LL exits at the same side of the housing 90 via the exit stub 7.1 at a high pressure compressor HDV on one hand and is supplied to a cylinder bank 150 at the other.

In the present embodiment, an upper guide area 21 leads to the only second opening 20 and a lower guide area 11 leads to the two first openings 10. The upper guide area 21 is in this way via the second opening 20 in communication with an exit stub 71. The lower guide area 11 is in this case via the two first openings 10 in communication with another exit stub 7.2, which is shown in FIGS. 3A (and 3B) only symbolically. From the exit stub, the charge air LL is supplied to the cylinders 101 of the cylinder bank 150. The exit stub 7.1 and the additional exit stub 7.2 are arranged at opposite sides of the double connection box 2—as shown. Still, in an arrangement not shown here also the lower guide area 11 may lead to another exit stub, which is arranged at the same side of the double connection box 2 as the exit stub 7.1. This can be advantageous in particular if further down of a guide structure for charge air after the lower guide area 11 another connection of an exhaust gas of an exhaust gas recirculation AGR (not shown in FIG. 3A) is to be connected to the guide structure for the charge air. This could basically be provided for after the exit stub 7.2 indicated in FIG. 3A. In a variant not shown in the drawings could also be done with an extension of the lower guide area 11 into the exit stub 7.1 as will be explained below with regard to FIG. 4.

Within the interior essentially two guide areas 11, 21 of the double connection box 2 of the cooler arrangement 1A are in communication via the openings 11, 21; a lower guide area is assigned to a first opening 10 and the upper guide area is assigned to a second opening in the manner explained above. The lower guide area 11 is immediately adjacent the outlet of the lower high pressure charge air cooler HD-LLK. The upper guide area 21 is immediately adjacent the outlet of the upper low pressure charge air cooler ND-LLK. The interior of the housing 30 of the double connection box 2 is divided by the separation wall 5 extending inclined in the wall area 6 into the mentioned lower guide area 11 and the mentioned upper guide area 21. This inclined separation of the interior space into the lower guide area 11 and the upper guide area 11 is shown in the longitudinal cross-sectional figure of the double connection box 2 of FIG. 3A. In the cross-sectional view of the double connection box 2 of the FIG. 4, the arched area of the separation wall 5 is visible.

The arched area of the separation wall extends between two laterally arranged mostly vertical webs 8 which divide the lower guide area 11 into sections which are in communication with one another. The lateral webs 8 are part of the frame 39 formed by the separation wall 5 and the lateral channel walls 9. Between the channel walls 9 and the webs in each case a lateral guide channel with a first section 11.1 of the lower guide area 11 is formed, which directly joins the opening 10. In a rear area of the lateral guide channel, the first section 11.1 transitions into a second section 11.2 which forms the rear part of the lower guide area 11. In this rear part of the lower guide area 11, the double connection box 2 is provided at its underside with a lower connection 33. The lower connection 33 forms an opening which serves as a discharge connection for discharging charge air LL from the high pressure charge air cooler HD-LLK. To the lower connection 33, a housing 40 of the high pressure charge air cooler HD-LLK is attached. The housing 30 of the double connection box 2 is attached to the housing 40 by means of screw connections 41. The charge air LL is conducted from the housing 40 of the high pressure charge air cooler HD-LLK into the housing 30 of the double connection box 2 and further to the first section 11.1 of the lower guide area 11 and in the longitudinal direction of the cooling arrangement 1 to the further outlet stub 7.2. As shown in FIG. 3A, the charge air LL reaches the second section 11.2 of the lower guide area 11.2 via the lower connection 33 in a state as cooled in the high pressure charge air cooler HD-LLK. The high pressure charge air cooler HD-LLK is reached by the charge air LL from the lower connection box 3. The charge air LL enters the lower connection box 3 from the high pressure compressor HDV via an inlet stub which is not described and is supplied to the housing 30 of the double connection box 2 in the way described.

The second opening 20 which is shown in FIG. 3A is disposed adjacent the upper guide area 21 of the double connection box 2 to which the charge air LL is conducted from the low pressure charge air cooler ND-LLK via an upper connection 34. Out of a lower pressure compressor, the charge air is conducted to the low pressure charge air cooler ND-LLK via an upper connection box 4. The upper connection box 4 is provided for this purpose with an inlet stub which is not designated.

Referring to FIG. 3A, the separating wall 5 at the wall area 6 in the interior of the housing 30 of the double connection box 2 is so designed that the lower guide area widens in the second section 11.2 toward the connection 33 of the high pressure charge air cooler HD-LLK. The lower guide area 11 widens toward the first opening 10. In other words, the lower guide area 11 narrows down in the wall area 6 that is it has a reduced cross-section which has been found to be advantageous for guiding the charge air LL.

The upper guide area 21 includes, as shown in FIG. 3A, a cross-section reduction T1. From the reduced cross-section area T1, the upper guide area 21 widens toward the upper connection 34 whereby an advantageous diffuser effect is achieved. The upper guide area 21 also becomes wider from the upper reduced cross-section area T1 toward the opening 20 which is also advantageous for the flow of the charge air.

Coolant KM is supplied at a side of the cooler housing 40, 50 opposite the cooler stub 7 as shown in FIG. 3A. This has been found to be simple and at the same time to save space.

As shown in FIG. 4, the whole cooler arrangement 1 may be arranged in the intermediate space between the cylinders 101 of a V-type internal combustion engine, that is, it is space-saving and also used as the lower wall of a lower connection box of the cooler arrangement 1.

FIG. 3B shows a cooler arrangement which is slightly modified from the embodiment shown in FIG. 3A. For the arrangement of the double connection box 2 as well as the housing 90, the arrangements as shown in FIG. 32 are relevant. Because of the different arrangement of the low pressure charge air cooler ND-LLK and the high pressure cooler HD-LLK of the cooler arrangement 1B there is however a different charge air LL guide pattern which is shown in FIG. 3B. Here, the lower first Charge air cooler which is connected to the lower connection 33 is a low pressure charge air cooler ND-LLK. The upper second charge air cooler which is connected to the upper connection 34 is in the embodiment shown in FIG. 3B, the high pressure charge air cooler HD-LLK. The charge air path is accordingly indicated by the arrows.

Charge air is supplied from a low pressure compressor NDV of a low pressure exhaust gas turbocharger ND-ATL to an inlet stub (not shown) of the lower connection box 3. From the lower connection box 3, the charge air is then supplied to the low pressure charge air cooler ND-LLK which is arranged in the cooler housing 40 and leaves the cooler in cooled form via the lower connection 33 to the low guide area 11 of the interior of the double connection box 2.

Also, in the embodiment shown in FIG. 3B, the charge air LL leaves the double connection box 2 via an additional outlet stub 7.2 connected to high pressure compressor HDV of a high pressure turbocharger HD-ATL. In highly compressed form the charge air LL is then supplied to an inlet stub (not shown) of the upper connection box 4. Then the charge air is supplied to the high pressure charge air cooler HD-LLK, which is arranged in the housing 50 between the upper connection box 4 and the double connection box 2. The housing 50 is screwed onto a support flange of the double connection box 2 in the area of the upper connection 34. Via the upper connection 34, the cooled highly compressed charge air reaches the interior of the double connection box 2, that is, the upper guide area 21 thereof. The upper guide area 21 and the lower guide area 11 are—as mentioned already in connection with the cooler arrangement 1A—also in the cooler arrangement 1B separated by a separation wall 5 in the double connection box. Charge air LL from the low pressure charge air cooler in the lower guide area 11 and charge air LL from the high pressure charge air cooler in the upper guide area 21 is also separated in the interior of the double connection box 2.

Since in the cooler arrangement 1A and also the cooler arrangement 1B, only cooled charge air LL enters the interior of the double connection box 2 a heat exchange via the separation wall is only relatively small.

Finally, the charge air LL reaches the outlet stub 7.1 and leaves toward the cylinders of the cylinder bank 150.

In both embodiments of the cooler arrangements 1A, 1B, a guide area 11, 21 of the interior of the double connection box 2, there is a cross-section reduction T1, T2.

In this way, a section of the lower guide area 11 between the lower connection 33 and the reduced cross-section T2 forms a diffuser. As a result, the lower pressure, cooled charge air reaches the rear section 11.2 of the lower guide area 11 from the low pressure charge air cooler ND-LLK in a uniform flow.

With the reduced cross-section T1 between the upper convection 34 and the outlet stub 7.1 of the upper guide area 21, the high pressure compressed and cooled flow of charge air LL from the high pressure charge air cooler HD-LLk can be smoothened up to the reduced cross-section area T1 and contained. After the reduced cross-section T1, the outlet stub 7.1 is funnel-like, widened in order to provide a smooth inlet flow into another charge air guide structure extending to the cylinder bank 150.

As a result, with the double connection box 2 of the type described herein, low pressure compressed and high pressure compressed charge air is separately guided in the interior of the double connection box 2. The separation wall 5 provided herefor extends in a wall area 6 at an angle and extends such that a lower guide area 11 and an upper guide area 21 each narrow down from a connection 33, 34 toward an outlet stub of the double connection box 2 up to a reduced flow cross-section area T1, T2. In this way, the charge air is conducted out of the charge air cooler LLK with a low flow resistance while being accelerated. In addition with the described double connection box 2, the charge air LL is conducted in a counter-current flow of similar temperature. In addition, the double connection box has connections 33, 34 which need to be designed only for receiving cooled air.

Finally, with a double connection box 2 as described in FIG. 4 a rear section 11.1 and a front second section 11.2 of a lower guide area 11 the charge air LL can be supplied on one side under low compression and at the opposite side under high pressure and are supplied separately to a common stub at the same side of the double connection box 2. To this end, a separation wall 5 of the double connection box can be arched over a cross-section in a way as described based on FIG. 4 and be separated from lateral guide channels by webs 8.

REFERENCE LIST

| | |
|---|---|
| 1000 | Internal combustion engine |
| 100 | Engine housing |
| 101 | Cylinder |
| 102 | Charging fluid supply line |
| 150 | Cylinder bank |
| 200 | Charge air compression arrangement |
| 300 | Exhaust gas recirculation arrangement |
| 210 | Low pressure stage |
| 220 | High pressure stage |
| LL | Charge air |
| AG | Exhaust gas |
| LF | Charge fluid |
| 200 | Compression arrangement |
| NDV | Low pressure compressor |
| ND-LLK | Low pressure charge air cooler |
| ND-ATL | Low pressure exhaust gas turbocharger |
| HDV | High pressure compressor |
| HD-LLK | High pressure charge air cooler |
| ND-ATL | High pressure exhaust gas turbocharger |
| 1, 1A, 1B | Cooler arrangement |
| 2 | Double connection box |
| 3 | Lower connection box |
| 4 | Upper connection box |
| 5 | Separation wall |
| 6 | Wall area |
| 7.1, 7.2 | Exit stub, outlet stub |
| 8 | |
| 9 | Channel wall |
| 10, 20 | Opening, passage |
| 11 | Lower guide area |
| 11.1 | First section |
| 11.2 | Second section |
| 21 | Upper guide area |
| 30 | Housing of the double connection box |
| 31 | Lower edge |
| 32 | Upper edge |
| 33 | Lower connection |
| 34 | Upper connection |
| 39 | Frame |
| 40, 50 | Cooler housing |
| 90 | Housing |
| T1, T2 | Cross-section reduction |
| KS | Power output end |

What is claimed is:

1. A connection box for a cooler arrangement (1, 1A, 1B) of an internal combustion engine (1000) with two-stage charging in combination with a charge air cooling arrangement for guiding charge air (LL), the connection box being in the form of a double connection box (2), including
a lower connection (33) for connection to a first charge air cooler (HD-LLK) disposed below the double connection box (2),
an upper connection (34) for connection to a second charge air cooler (ND-LLK) disposed above the double connection box (2), and
a guide structure disposed in the double connection box (2) for conducting charge air through the double connection box (2) and including a separation wall (5) disposed in the interior of the double connection box (2) so as to define a lower guide area (11) adjacent to, and in communication with, the lower connection (33) and an upper guide area (21) adjacent to, and in communication with, the upper connection (34).

2. The connection box according to claim 1, wherein the separation wall (5) includes an inclined wall area (6) extending in the interior of the double connection box (2) at an inclined angle so as to widen the guide area (11) toward the lower connection (33) of the first charge air cooler (HD-LLK) and the guide area (21) of the upper guide area (21) toward the upper connection (34) of the second charge air cooler (ND-LLK).

3. The connection box according to claim (2), wherein the inclined wall area (6) of the separation wall (5) provides for a widening of the lower guide area (11) toward the first opening (10) and of the upper guide area (21) toward the second opening (20).

4. The connection box according to claim 1, wherein the double connection box (2) has at least one first opening (10) to the lower guide area (11) and the lower guide area (11) has a reduced cross-section area T2 between the first opening (10) and the lower, connection (33) in a wall area (6) of the separation wall (5).

5. The connection box according to claim 4, wherein the double connection box (2) has at least one second opening (20) to the upper guide area (21) and the upper guide area (21) has a reduced cross-section area T1 between the second opening (20) and the upper connection at an outer wall area of a housing wall of the double connection box (2).

6. The connection box according to claim 1, wherein the double connection box (2) is provided for one of guiding a charge air to the first charge air cooler and to the second charge air cooler and guiding charge air out of the first charge air cooler and the second charge air cooler, wherein the lower and the upper guide area (11, 21) are in the form, of discharge areas and the lower, and upper connections are charge air outlet connections for conducting charge air from the first to the second charge air cooler.

7. The connection box according to claim 6, wherein the lower and the upper guide areas (11, 21) are so designed that a counter charge air flow is established in the lower and upper guide areas (11, 21).

8. The connection box according to claim 1, wherein the lower connection (33) is formed at a lower side and the upper connection (34) is formed at an upper side opposite the lower side of the double charge air connection box (2) and at least the upper connection (34) includes a flange in the form of a support flange.

9. A cooler arrangement (1, 1A, 1B) for an internal combustion engine (1000) with two stage charge air charging comprising:
a first charge air cooler and a second charge air cooler one being a low pressure charge air cooler (ND-LLK) and the other being a high pressure charge air cooler (HD-LLK),
a double connection box (2) arranged between the first and the second charge air coolers, the double connection box (2) including
a lower connection (33) for connection to the first charge air cooler disposed below the double connection box (2),
an upper connection (34) for connection to the second charge air cooler disposed above the double connection box (2), and
the double connection box (2) including a guide structure for separately conducting charge air through the double connection box (2) and a separation wall (5) disposed in the interior of the double connection box (2) so as to define a lower guide area (11) adjacent to, and in communication with, the first charge air cooler (HD-LLK) and an upper guide area (21) adjacent to, and in communication with, the second charge air cooler (ND-LLK).

10. The cooler arrangement according to claim 9, wherein a first and a second opening (10, 20) for charge air are arranged at a single side of a housing extending around the double connection box (2).

11. The cooler arrangement according to claim 10, wherein cooling means connections (KM) are provided on one side of the housing (90) opposite the side provided with the first and second charge air openings (10, 20).

12. The cooler arrangement according to claim 10, wherein the second opening (20) is arranged between two spaced first openings (10) in a common frame (39) defining a space separated by the separation wall (5).

13. The cooler arrangement according to claim 12, wherein the separation wall (5) is downwardly arched in the area of one of the openings (20) to separate a communication space of the one opening (20) from that of the other openings (10).

14. The cooler arrangement according to claim 9, wherein the double connection box (2) is formed in, or as part of, a housing (90) of at least one of the first and the second charge air coolers.

15. The cooler arrangement according to claim 9 including a lower, connection box (3) arranged directly below the first charge air cooler for guiding charge air to, or from, the first charge air cooler.

16. The cooler arrangement according to claim 9, including an upper connection box (4) arranged directly above the second charge air cooler for guiding charge air to, or from, the second charge air cooler.

17. An internal combustion engine (1000) with an engine housing (100) and a charge air cooling arrangement (1, 1A, 1B) of the internal combustion engine (1000) with two stage charge air charging comprising:
a first charge air cooler and a second charge air, cooler, one being a low pressure charge air cooler (ND-LLK) and the other being a high pressure charge air cooler (HD-LLK),
at least one connection box arranged between the first and the second charge air coolers, the connection box being in the form of a double connection box (2) including
a lower connection (33) for connection to the first charge air cooler disposed below the double connection box (2),
an upper connection (34) for connection to the second charge air cooler disposed above the double connection box (2), and,
a guide structure disposed in the double connection box (2) for separately conducting charge air through the double connection box (2) and including a separation wall (5) disposed in the interior of the double connection box (2) so as to define a lower guide area (11) adjacent to, and in communication with, the first charge air cooler (HD-LLK) and an upper guide area (21) adjacent to, and in communication with, the second charger air cooler (ND-LLK), said cooler arrangement (1, 1A, 1B) being arranged on top of the engine housing (100).

18. The internal combustion engine (1000) according to claim 17, wherein the engine housing (100) has a V-arrangement of cylinders and the charge air, cooling arrangement (1, 1A, 1B) is disposed on the intermediate area between the V-arrangement of the cylinders.

19. The internal combustion engine according to claim 17, wherein the engine housing (100) forms the lower wall area of the lower connection box (3), which is connected directly to the lower charge air cooler for guiding the charge air to, or from, the charge air cooling arrangement (1, 1A, 1B).

20. The internal combustion engine according to claim 17, wherein in the charge air cooling arrangement (1, 1A, 1B) the first charge air cooler is a low pressure charge air cooler (ND-LLK) and the second charge air cooler is a high pressure charge air cooler (HD-LLK).

\* \* \* \* \*